United States Patent [19]

Aronberg

[11] E Re. 28,472

[45] Reissued July 8, 1975

[54] FLUX FOR USE IN SOLDERING OF STAINLESS STEELS

[75] Inventor: Lester Aronberg, Chicago, Ill.

[73] Assignee: Lake Chemical Co., Chicago, Ill.

[22] Filed: Apr. 5, 1974

[21] Appl. No.: 458,195

Related U.S. Patent Documents

Reissue of:

[64] Patent No.: 3,597,285
Issued: Aug. 3, 1971
Appl. No.: 821,482
Filed: May 2, 1969

[52] U.S. Cl. ..... 148/26; 148/25
[51] Int. Cl. ..... B23k 35/34
[58] Field of Search ..... 148/23–26; 29/495, 496

[56] References Cited

UNITED STATES PATENTS

| | | | |
|---|---|---|---|
| 2,031,909 | 2/1936 | Schweitzer | 148/26 |
| 2,658,846 | 11/1953 | DeRosa et al. | 148/251 |
| 2,845,700 | 8/1958 | Bagno | 148/25 X |
| 2,987,817 | 6/1961 | Kozlik | 29/494 |

FOREIGN PATENTS OR APPLICATIONS

| | | | |
|---|---|---|---|
| 39,505 | 2/1963 | Japan | 148/26 |

OTHER PUBLICATIONS

Ebling & Scheil, "A Standard Laboratory Corrosion Test for Metals in Phosphoric–Acid Service," pp. 975–987, (Transactions of the ASME, 10/1951).

*Primary Examiner*—Peter D. Rosenberg
*Attorney, Agent, or Firm*—Wallenstein, Spangenberg, Hattis & Strampel

[57] ABSTRACT

Fluxes for use in soldering stainless steels comprising compositions containing a major proportion of orthophosphoric acid and a minor proportion of (a) finely divided metallic copper, or (b) a copper salt, such as copper phosphate, which is soluble in orthophosphoric acid, advantageously in admixture with various supplemental materials.

23 Claims, No Drawings

FLUX FOR USE IN SOLDERING OF STAINLESS STEELS

Matter enclosed in heavy brackets [ ] appears in the original patent but forms no part of this reissue specification; matter printed in italics indicates the additions made by reissue.

---

This invention relates to novel fluxes for use in soldering of stainless steels and to the soldering of stainless steels with said fluxes.

In the soldering of stainless steels, various fluxes have been suggested, such as zinc chloride or zinc chloride and hydrochloric acid, but they are corrosive and have been found to be quite unsatisfactory. Perhaps the most satisfactory of the fluxes used in the soldering of stainless steels is orthophosphoric acid. However, orthophosphoric acid, too, has certain objections. While it is generally non-corrosive towards stainless steels during the actual fluxing operations, it fails to bring about fully satisfactory soldered joints due to the fact that it has inadequate wetting, spreading and capillary action, even when used in high concentrations.

It has been found, in accordance with the present invention, that markedly improved fluxes for use in soldering stainless steels can be made by incorporating into a phosphorus-containing acid minor proportions of copper or one or more *of certain* copper salts and, in the particularly preferred embodiments of the invention, certain additional ingredients. The resulting fluxes are characterized by excellent resistance to corrosive effects, and substantially improved wetting, spreading and capillary action. The result is that they enable soldered joints to be obtained which are characterized by exceptional strength due to excellent surface coverage of the interface between the stainless steel and the metal to which it is soldered.

The major ingredient of the improved fluxes of the present invention, as indicated above, is a phosphorus-containing acid. Orthophosphoric acid is most advantageously utilized, both from the standpoint of its functioning and its commercial availability and low cost, but phosphorus acid (usually available in aqueous solution in 70–72% concentrations) can be employed. The orthophosphoric acid may be in the form of aqueous orthophosphoric acid containing as low as 40% orthophosphoric acid, or it may be as high as about so-called commercial 115% phosphoric acid, but it is preferred to utilize about 75% to 105% orthophosphoric acid.

*Metallic* [ While, in the broadest aspects of the invention, metallic ] copper [ or any copper salt ] can be used. [ , it is advantageous to avoid the use of copper chloride or other copper halides, or copper sulfate or copper nitrate since they leave somewhat corrosive residues. ] Among the [ other ] copper salts which can be used are copper acetate, basic cupric chromate, cupric dichromate, copper salicylate, cupric phosphite, and cupric phosphate. While cupric phosphate ($Cu_3(PO_4)_2 \cdot 3H_2O$) can be added to the orthophosphoric acid, it is especially advantageous to incorporate the copper ion by adding cupric or cuprous carbonate, particularly basic copper carbonate ($CuCO_3.Cu(OH)_2$), to the orthophosphoric acid. This results in the in situ formation of copper phosphate with the evolution of carbon dioxide. Copper salt complexes can also be used such as those formed from copper salts and ammonia or amines. Copper oxides and copper hydroxides can also be employed as the source of the copper ion as, indeed, can also metallic copper or copper-base alloys, although such source of copper are not preferred. Cuprous oxide reacts, of course, to at least some extent with the orthophosphoric acid to produce copper phosphate. While it is particularly desirable that the copper salt be fully soluble in the phosphorus-containing acid, such is not essential as the copper salt may be dispersible or suspendable in said acid. Similarly, while metallic copper is essentially not soluble in orthophosphoric acid, where metallic copper, or a copper-base alloy, or an insoluble copper salt is used as the copper source, it should be employed as a finely divided powder so that a dispersion or suspension is formed in the phosphorus-containing acid. The term "copper salt," as used in the claims, is intended to cover copper in the form of its *aforementioned* simple salts, complex salts, or other *non-halide* copper-containing compounds. The term "metallic copper," as used in the claims, is intended to cover metallic copper or copper alloys as, for example, copper bronzes, brasses, and the like. The copper salts may comprise from as low as about 1% to as high as about 40% by weight of the phosphorus-containing acid. It is more desirable to employ from about 5% to about 20% of the copper salt, with about 10% being a good average in most cases. Where metallic copper is used, it is desirably employed in amounts in the range of about 1% to 10%, better still, about 2% to 5%, by weight of the phosphorus-containing acid.

Various supplemental agents can be added to obtain particular effects. Thus, for instance, ammonia, organic amines such as cyclohexylamine or triethanolamine, or ammonium phosphates can be added which act protectively against adverse effects which might occur on overheating the joints to be soldered during the soldering operation. The proportions thereof are variable, but, generally, it is desirable that, when used, they comprise from about 20% to about 60% by weight of the phosphorus-containing acid. Surfactants of the nonionic type and exemplified by normally solid, paste or liquid "Pluronics" (Wyandotte Chemicals Corp.) can also be incorporated. The "Pluronics," as is well known, are condensates or adducts of ethylene oxide with hydrophobic bases, in the form of polyoxypropylene glycols generally having a molecular weight of 1200 or higher, and are disclosed, for example, in U.S. Pat. Nos. 2,674,619 and 2,677,700. Other nonionic surfactants can be used such as ethylene oxide adducts of hydrophobic materials such as ethylene oxide adducts of $C_{12}$–$C_{20}$ linear and branched chain alcohols, including oxo alcohols, and ethylene oxide adducts of $C_9$–$C_{18}$ alkyl phenols, said nonionic surfactants being, per se, well known and being disclosed in many U.S. patents as, for instance, in Nos. 1,970,578; 2,965,678 and as intermediates in No. 3,004,056. It is particularly desirable to use viscous or paste forms of the "Pluronics," illustrative of which is the paste product sold under the designation "Pluronic P–84." The nonionic surfactants function, in certain instances, to improve the homogeneity of the fluxes, and they also tend to enhance the wetting and spreading properties of the fluxes during the soldering operation. The nonionic surfactants, where utilized, are desirably employed in amounts of about 2 to 25%, particularly 3 to 10%, by weight of the phosphorus-containing acid.

The fluxes of the present invention can be used in liquid or solid, generally paste, form. Particularly where they are used in connection with the soldering of pipe joints, it is especially desirable, for ease of application, that said fluxes be employed as thick or heavily viscous liquids or, better still, in solid or paste form.

The following examples are illustrative of the preparation of the improved fluxes made in accordance with the invention. It will be understood that numerous other fluxes can be made in the light of the guiding principles and teachings disclosed above.

EXAMPLE 1

| | G. |
|---|---|
| Orthophosphoric acid (75%) | 100 |
| Basic copper carbonate | 2 |

The basic copper carbonate is added to the orthophosphoric acid, with stirring. Carbon dioxide gas is evolved. The resulting flux is a thick syrupy product with the copper phosphate dissolved in the orthophosphoric acid.

EXAMPLE 2

| | G. |
|---|---|
| Orthophosphoric acid (75%) | 100 |
| Basic copper carbonate | 10 |

[ EXAMPLE 3 ]

| | [ G ] |
|---|---|
| [ Orthophosphoric acid (105%) | 100 ] |
| [ Cuprous chloride | 20 ] |

EXAMPLE [ 4 ] 3

| | G. |
|---|---|
| Orthophosphoric acid (75%) | 100 |
| Mono-ammonium phosphate | 40 |
| Basic copper carbonate | 8 |
| "Pluronic" 84 | 15 |

The basic copper carbonate is initially mixed with the orthophosphoric acid, as described in Example 1, then the remaining ingredients are incorporated under conditions of agitation to form a homogeneous mixture.

EXAMPLE [ 5 ] 4

| | G. |
|---|---|
| Orthophosphoric acid (105%) | 100 |
| Ammonia (37°) (to be added gradually to the phosphoric acid) | 40 |
| Basic copper carbonate | 10 |
| "Pluronic" 84 | 20 |

EXAMPLE [ 6 ] 5

| | G. |
|---|---|
| Orthophosphoric acid (75%) | 100 |
| Metallic copper (200 mesh) | 4 |
| "Pluronic" 84 | 15 |

EXAMPLE [ 7 ] 6

| | G. |
|---|---|
| Phosphorous acid (70–72%) | 100 |
| Basic cupric carbonate | 10 |
| "Pluronic" 84 | 12 |

The stainless steels which can be soldered with the improved fluxes of the present invention can be chosen from among the many which are well known to the art. Illustrative of such stainless steels are those containing chromium, for instance, of the order of 18% chromium; those containing chromium and titanium, for instance, those containing of the order of 12% chromium and 2% titanium; those containing varying proportions of chromium and nickel; and those containing varying proportions of chromium, titanium, nickel and vanadium. Illustrative of such stainless steels are those sold commercially under the trade designations 300 series and 400 series, and "TI-CHROME" (Crucible Steel Corporation).

In soldering the stainless steels to form joints with various metals, which latter may be copper, copper-base alloys and copper-containing alloys, non-stainless steels, and stainless steels, and the like, various solders can be employed such as, for instance, 50% tin — 50% lead; 60% tin — 40% lead; 95% tin — 5% antimony; 40% tin — 60% lead; 30% tin — 70% lead; and variants of such solders and other known soft solders. It is especially desirable to use approximately 50% tin — 50% lead solders since they have good flow properties at relatively low temperatures.

Conventional soldering techniques and conventional soldering temperatures are used with the improved fluxes of the present invention, being employed in the same general manner in which orthophosphoric acid has heretofore been used as a flux so that no detailed explanation is necessary.

What is claimed is:

[ 1. A flux for use in soldering stainless steels which comprises, as essential ingredients, a major proportion of at least one phosphorus-containing acid selected from the group of orthophosphoric acid and phosphorus acid, and a minor proportion of at least one member selected from the group of (a) finely divided copper and (b) copper salts. ]

[ 2. The flux of claim 1 in which the phosphorus-containing acid comprises 75–105% orthophosphoric acid. ]

[ 3. The flux of claim 2 in which the copper salt is soluble in said orthophosphoric acid. ]

[ 4. The flux of claim 3 in which the copper salt comprises a copper phosphate. ]

[ 5. The flux of claim 1 in which the phosphorus-containing acid comprises 75–105% orthophosphoric acid and the copper salt comprises a copper phosphate, the copper phosphate constituting from about 5 to 15% by weight of the orthophosphoric acid. ]

[ 6. The flux of claim 3 in the form of a viscous liquid to paste product. ]

[ 7. The flux of claim 4 which includes an ammonium phosphate. ]

[ 8. The flux of claim 7 which includes a minor proportion of a nonionic surfactant. ]

[ 9. A flux in accordance with claim 7 wherein the following ingredients are present in approximately the stated parts by weight:

| | Parts |
|---|---|
| Orthophosphoric acid (75%) | 100 |
| Copper phosphate | 5–15 |
| An ammonium phosphate | 30–60 ]. |

[ 10. A flux in accordance with claim 2, in which the copper is present in the form of a complex copper-ammonium salt. ]

11. The method of making a flux for use in soldering stainless steels which comprises admixing approximately 100 parts of 75–105% phosphoric acid with from 1 to 20 parts of basic copper carbonate and with from 20 to 60 parts of an ammonium phosphate, said parts being by weight.

12. The method of claim 11 which includes incorporating with said ingredients from about 2 to 25 parts by weight of a nonionic surfactant.

[ 13. In the soldering of stainless steel in which a soldering flux is utilized, the improvement which comprises utilizing as said flux the flux of claim 1. ]

[ 14. In the soldering of stainless steel in which a soldering flux is utilized, the improvement which comprises utilizing as said flux the flux of claim 4. ]

[ 15. In the soldering of stainless steel in which a soldering flux is utilized, the improvement which comprises utilizing as said flux the flux of claim 6. ]

[ 16. In the soldering of stainless steel in which a soldering flux is utilized, the improvement which comprises utilizing as said flux the flux of claim 9. ]

*17. A flux for use in soldering stainless steels which comprises, as essential ingredients, a major proportion of at least one phosphorus-containing acid selected from the group of orthophosphoric acid and phosphorus acid, to which has been added from 5 to 20%, by weight of said acid, of a copper salt selected from the group consisting of copper acetate, basic copper carbonate, cupric carbonate, cuprous carbonate, basic cupric chromate, cupric dichromate, copper oxides, copper hydroxides, copper salicylate, cupric phosphite, cupric phosphate, and copper salt complexes with ammonia or amines, said flux being essentially free from halides.*

*18. The flux of claim 17 in which the added copper compound constitutes from about 5 to about 10% by weight of said acid.*

*19. The flux of claim 18 in the added copper compound is basic copper carbonate.*

*20. The flux of claim 18 in which the added copper compound is a copper phosphate.*

*21. The flux of claim 17 in which the phosphorus-containing acid comprises 75–105% orthophosphoric acid.*

*22. The flux of claim 17 wherein the following ingredients are present in approximately the stated parts by weight:*

| | Parts |
|---|---|
| *75%–105% orthophosphoric acid* | 100 |
| *Copper phosphate* | 5–15 |
| *An ammonium phosphate* | 30–60. |

*23. A flux for use in soldering stainless steels which comprises, as essential ingredients, a major proportion of at least one phosphorus-containing acid selected from the group of orthophosphoric acid and phosphoric acid, to which has been added from 4 to 10%, by weight of said acid, of metallic copper, said flux being essentially free from halides.*

*24. The flux of claim 23 in which the phosphorus-containing acid comprises 75–105% orthophosphoric acid.*

*25. A flux for use in soldering stainless steels which comprises, as essential ingredients, a 40–115% orthophosphoric acid to which has been added finely divided copper, the aforesaid ingredients being admixed in proportions, per 100 parts of said orthophosphoric acid, of from 5 to 10 parts of said finely divided copper, said parts being by weight, and the resulting flux being essentially free of halides.*

*26. A flux for use in soldering stainless steels which comprises, as essential ingredients, a major proportion of 75–105% orthophosphoric acid and a copper phosphate, the copper phosphate constituting from about 5 to 15% by weight of the orthophosphoric acid, said flux being essentially free of halides.*

*27. The flux of claim 26 which includes an ammonium phosphate.*

*28. The flux of claim 26 which includes a minor proportion of a nonionic surfactant.*

*29. A flux for use in soldering stainless steels which comprises, as essential ingredients, a major proportion of 75–105% orthophosphoric acid, and a minor proportion of a complex copper-ammonium salt, said flux being essentially free of halides.*

*30. A flux for use in soldering stainless steels which comprises, as essential ingredients, a 75–115% orthophosphoric acid and a non-halide copper salt, the aforesaid ingredients being present in proportions, per 100 parts of said acid, of from 5 to 20 parts of said non-halide copper salt, said parts being by weight, said flux being essentially free of halides.*

*31. In the soldering of stainless steels in which a soldering flux is utilized, the improvement which comprises utilizing as said flux the flux of claim 17.*

*32. In the soldering of stainless steels in which a soldering flux is utilized, the improvement which comprises utilizing as said flux the flux of claim 20.*

*33. In the soldering of stainless steels in which a soldering flux is utilized, the improvement which comprises utilizing as said flux the flux of claim 22.*

*34. In the soldering of stainless steels in which a soldering flux is utilized, the improvement which comprises utilizing as said flux the flux of claim 23.*

*35. In the soldering of stainless steels in which a soldering flux is utilized, the improvement which comprises utilizing as said flux the flux of claim 30.*

*36. In the soldering of stainless steels in which a soldering flux is utilized, the improvement which comprises utilizing as said flux a flux which comprises as essential ingredients, a 75–115% orthophosphoric acid and a non-halide copper salt, the aforesaid ingredients being present in proportions, per 100 parts of said acid, of from 1 to 20 parts of said non-halide copper salt, said parts being by weight, said flux being essentially free of halides.*

*37. In the soldering of stainless steels in which a soldering flux is utilized, the improvement which comprises utilizing as said flux a flux which comprises, as essential ingredients, a major proportion of at least one phosphorus-containing acid selected from the group of orthophosphoric acid and phosphorus acid, to which has been added from 1 to 10%, by weight of said acid, of metallic copper, said flux being essentially free from halides.*

* * * * *